Jan. 9, 1951

J. L. ZAR 2,537,200

PIVOT-BEARING

Filed June 14, 1946

INVENTOR
Jacob L. Zar
BY
ATTORNEY

Patented Jan. 9, 1951

2,537,200

UNITED STATES PATENT OFFICE 2,537,200

PIVOT BEARING

Jacob L. Zar, Orange, N. J., assignor to Thomas A. Edison, Incorporated, West Orange, N. J., a corporation of New Jersey Application June 14, 1946, Serial No. 676,614

2 Claims. (Cl. 308—159)

My invention relates to novel pivot-bearings which are adapted to provide electric circuit connections to the movable elements of the bearings without subjecting those elements to any mechanical torque.

My invention is intended particularly for use in instruments wherein current connections are to be made to a rotor without imposing any substantial load or mechanical torque thereon, and wherein the rotor is pivoted in jewel bearings such as of glass or sapphire. A class of such instruments, for example, is the moving-coil ratiometer type of electrical measuring instrument. Heretofore the circuit connections have been made to the rotor in such instruments by means of so-called "zero test" springs. These are very fragile instrument springs which are undesirable to use because they are expensive and are very difficult to handle and assemble. By my invention the need for such springs is eliminated.

It is an object of my invention to provide a jewel-type pivot bearing having associated therewith an electrically-conductive medium to provide a current connection to the pivoted element without subjecting that element to any mechanical torque.

It is another object to provide a pivot bearing having associated therewith a liquid medium for damping the pivoted element.

It is another object to provide such pivot-bearings which can be used in all positions and which are adapted to withstand shock and vibration.

Other objects are to provide such bearings which are cheap, durable and easy to assemble.

Still other objects and features of my invention will be apparent from the following description and the appended claims.

In the description of my invention reference is had to the accompanying drawings, of which:

Figure 1:
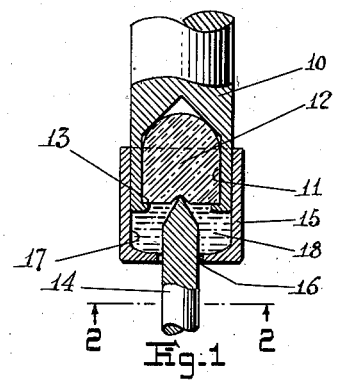
Figure 1 is a principally axially sectional view of a pivot-bearing according to one embodiment of my invention.
Figure 2:
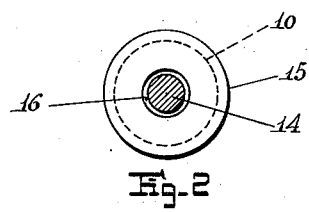
Figure 2 is a section taken substantially on the line 2—2 of Figure 1.

The illustrative embodiment of my invention shown in Figures 1 and 2 comprises a stud 10 made preferably of stainless steel and having a mounting socket 11 in one end in which is held a jewel bearing 12 as by peening the edge of the stud as at 13. Such a jewel bearing is typically made of glass or sapphire; by way of example it is shown as being of the V type. Engaging this jewel bearing is a conical pivot 14. Ordinarily, in each application of the character abovementioned, the jewel bearing is a stationary part of the instrument and the pivot is one end of a rotor shaft that turns in the bearing, but it will be understood that this order of arrangement may be reversed so that the pivot is stationary and the bearing turns without departing from my invention.

Secured as by a press-fit to the stud 10 is a cup-shaped casing 15 which has an opening 16 in the bottom to clear the pivot 14. This casing forms a pocket 17 therewithin which is filled substantially with a conductive liquid 18 having a surface tension at least of the order of 300 dynes per centimeter of which mercury is the most suitable. In order that the mercury will be retained in the pocket in all positions of the pivot bearing and under conditions of vibration and shock of the bearing, the rim of the casing at the opening 16 is spaced at a minimum clearance distance from the pivot, typically a distance of the order of .010" to .020". Also, the pivot and casing are made of materials which will not be attacked or wetted by mercury, a preferable such material being stainless steel. Under these conditions it is found that the mercury will not flow out of the pocket 17 through the narrow space between the pivot and the casing but will be retained therein under all conditions of normal use of the instrument by reason of its having a relatively great surface tension which is negative with respect to the materials of which the pivot and casing are made.

It will be understood that the mercury in the pivot bearing provides an electrical connection from the stud 10 or casing 15 to the moving pivot 14 in all positions thereof without subjecting the pivot to any mechanical torque. However, as is desirable, the mercury subjects the pivot to some torsional damping because of its viscosity. On the other hand, the mercury does not alter appreciably the friction of the pivot in the bearing.

Figure 3:
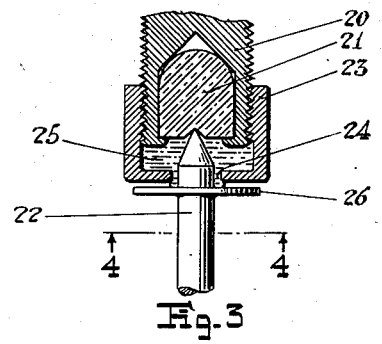
Figure 3 is a principally axially sectional view of a pivot-bearing according to a second embodiment of my invention.
Figure 4:
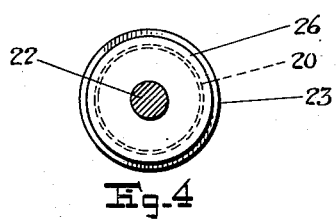
Figure 4 is a section taken on the line 4—4 of Figure 3.

In Figures 3 and 4 there is shown a modified pivot-bearing according to my invention which comprises a jewel screw 20 having mounted in one end a V-type jewel bearing 21. This jewel bearing is engaged by a conical pivot 22. Threaded onto the jewel screw is a cup-shaped casing 23 having a clearance opening 24 for the pivot. This casing is filled with mercury 25. Mounted on the pivot below the casing, or integral therewith if desired, is a disk-like baffle plate 26 which lies at a minimum clearance distance from the bottom of the casing so that it will suitably retain the mercury in the casing. All the elements which contact the mercury are here likewise to be of materials which are not attacked or wetted by the mercury—i. e., with respect to which the surface tension of the mercury is negative—and are preferably made of stainless steel.

It is to be noted that a fundamental difference between the two embodiments described above is that the first allows a wide latitude of adjustment of the pivot lengthwise thereof but relatively small lateral displacement thereof with respect to the bearing, and that the second allows wide lateral adjustment of the pivot, because the opening 24 may be made relatively large in diameter, but permits relatively little displacement of the pivot lengthwise thereof. The embodiment selected for any one application therefore depends upon whether the widest displacement tolerances for the pivot are lengthwise or lateral thereof.

The particular embodiments hereinabove described are intended to be illustrative and not limitative of my invention since the same are subject to changes and modifications without departure from the scope of my invention, which I endeavor to express according to the following claims.

I claim:

1. A pivot-bearing comprising a jewel bearing, a mounting for said bearing, a pivot engaging said bearing, a casing connected to said mounting and surrounding said pivot to form a pocket therewithin, mercury in said pocket for electrically connecting said pivot to said mounting, and a baffle on said pivot at right angles to the axis thereof and positioned outside said casing in close proximity with the edge of the casing at the opening of said pocket for retaining said mercury in the pocket in all positions of the pivot bearing while permitting removal of the pivot from said bearing and casing at will.

2. A pivot-bearing comprising a jewel-bearing member, a pivot member engaging said bearing member, a casing sealed to one of said members and surrounding the other at a distance therefrom to form a pocket therewithin, an electrically-conductive liquid in said pocket having a surface tension of the order of 300 dynes per centimeter or more, said casing and other member being of materials not wetted by said liquid, and means for retaining said liquid in said pocket in all positions of said pivot-bearing comprising a rim portion on said casing at a clearance distance from said other member and a baffle on said other member outside said casing and at a clearance distance from said rim portion.

JACOB L. ZAR.

REFERENCES CITED

The following references are of record in the file of this patent:

UNITED STATES PATENTS

| Number | Name | Date |
|---|---|---|
| 499,334 | Shallenberger | June 13, 1893 |
| 1,088,839 | Fiego | Mar. 3, 1914 |
| 1,754,085 | Faus | Apr. 8, 1930 |
| 2,127,196 | Worley | Aug. 16, 1938 |

FOREIGN PATENTS

| Number | Country | Date |
|---|---|---|
| 104,339 | Austria | Oct. 11, 1926 |